(12) United States Patent
Tsuneyoshi et al.

(10) Patent No.: US 7,842,372 B2
(45) Date of Patent: Nov. 30, 2010

(54) HONEYCOMB STRUCTURE (75) Inventors: Koji Tsuneyoshi, Tajimi (JP); Osamu Takagi, Tajimi (JP)

(73) Assignee: TYK Corporation, Tokyo (JP)

( * ) Notice: Subject to any disclaimer, the term of this patent is extended or adjusted under 35 U.S.C. 154(b) by 0 days.

(21) Appl. No.: 12/440,572

(22) PCT Filed: Jun. 16, 2008

(86) PCT No.: PCT/JP2008/060968

§ 371 (c)(1),
(2), (4) Date: Apr. 7, 2009

(87) PCT Pub. No.: WO2009/004912

PCT Pub. Date: Jan. 8, 2009

(65) Prior Publication Data

US 2010/0098903 A1    Apr. 22, 2010

(30) Foreign Application Priority Data

Jul. 3, 2007    (JP)    ............................. 2007-175076

(51) Int. Cl.
*B32B 3/12* (2006.01)
*B01D 39/06* (2006.01)
(52) U.S. Cl. .......................................... 428/116; 55/523
(58) Field of Classification Search ........................ None
See application file for complete search history.

(56) References Cited

U.S. PATENT DOCUMENTS

2004/0033175 A1*    2/2004    Ohno et al. .................. 422/180

FOREIGN PATENT DOCUMENTS

| EP | 1214973 A1 | 6/2003 |
|---|---|---|
| EP | 1338322 A1 | 8/2003 |
| EP | 1975138 A1 | 10/2008 |
| JP | 05023512 A | 2/1993 |
| JP | 93023512 | 2/1993 |
| JP | 2002-219319 | 8/2002 |
| JP | 2002 242655 | 8/2002 |
| JP | 2002-273131 | 9/2002 |

(Continued)

OTHER PUBLICATIONS

International Search Report from counterpart application No. PCT/JP2008/060968; Report dated Aug. 12, 2008; Japanese Patent Office.

(Continued)

*Primary Examiner*—Gordon R Baldwin
(74) *Attorney, Agent, or Firm*—Miller, Matthias & Hull (57) ABSTRACT

There is provided a honeycomb structure in which filtration efficiency of particulate matters (PM) in the exhaust gas is high, initial pressure loss is low and increase in pressure loss in accompanied with the trapping of PMs is suppressed.

The honeycomb structure includes a plurality of cells partitioned by a plurality of partition walls which are made of silicon carbide porous ceramics and are lined up in a single direction, an average pore diameter of the partition walls measured by mercury porosimetry is 1 μm to 15 μm, a standard deviation in a pore diameter distribution is 0.20 or less when the pore diameter is represented by common logarithm, and percentage of the pores having the pore diameter of less than 2 μm relative to the entire pores is 5 vol % or less.

3 Claims, 5 Drawing Sheets

FOREIGN PATENT DOCUMENTS

| | | |
|---|---|---|
| JP | 2003-193820 | 7/2003 |
| JP | 2005-023512 | 1/2005 |
| JP | 2005-519835 | 7/2005 |
| JP | 2005-296935 | 10/2005 |
| JP | 2006-096634 | 4/2006 |
| JP | 2006 096634 A | 4/2006 |
| WO | WO 01/70373 | 9/2001 |
| WO | WO 02 26351 | 4/2002 |
| WO | WO 03 086579 | 10/2003 |

OTHER PUBLICATIONS

Latest Office Action (other than "Decision to Grant a Patent") issued by the Japan Patent Office from counterpart application No. JP2007-175076.

* cited by examiner

HONEYCOMB STRUCTURE

TECHNICAL FIELD

The present invention relates to a honeycomb structure, in particular, to a honeycomb structure suitable for removing particulate matters from the exhaust gas of a diesel engine.

BACKGROUND ART

A honeycomb structure including a plurality of cells partitioned by a plurality of partition walls which are made of porous ceramics and are lined up in a single direction is conventionally used as a filter which traps and removes particulate matters (hereinafter, referred to as "PM") such as soot contained in the gas exhausted from a diesel engine. In such a honeycomb structure, generally, cells one ends of which are sealed and cells the other ends of which are sealed are alternatively arranged. The gas flows in from the cells opened in one direction, passes through the porous partition walls, and flows out from the cells opened in the other direction. Then, when the gas passes through the partition walls, PMs in the gas are trapped and removed through surfaces and pores of the porous partition walls.

Therefore, when pore diameters are too large, PMs which pass through the partition walls without being trapped are increased so that filtration efficiency is lowered. On the other hand, when pore diameters are too small, pressure loss becomes large due to resistance to passage of the gas so that the load on the engine is increased. Then, in order to balance filtration efficiency and pressure loss which are inversely correlated, there is proposed a filter in which pore diameters of porous ceramics constituting the partition walls are controlled (see, for example, Patent Documents 1 and 2).

These filters are intended to have relative number of pores suitable for the trapping of PMs by setting pore diameters of the partition walls in a limited narrow range. An average value of the pore diameters measured by mercury porosimetry is set to be 1 μm to 15 μm in the former (Patent Document 1), and 20 μm to 60 μm in the latter (Patent Document 2), a standard deviation in a pore diameter distribution is set to be 0.20 or less when the pore diameter is represented by common logarithm.

[Patent Document 1] Japanese Patent No. 3272746

[Patent Document 2] Japanese Patent Application Laid-open No. 2002-242655

DISCLOSURE OF THE INVENTION

Problems to be Solved by the Invention

However, a filter in the former has low initial pressure loss, but still has a problem that pressure loss thereof is drastically increase in accompanied with the trapping of PMs. On the other hand, a filter in the latter has an advantage that increase in pressure loss is suppressed since a large number of pores in the filter are relatively large and a catalyst is hardly filled by deposition of PMs even when the filter carries the catalyst, but has a problem that filtration efficiency is not sufficient.

In view of the above circumstances, an object of the present invention is to provide a honeycomb structure in which filtration efficiency of particulate matters (PMs) in the exhaust gas is high, initial pressure loss is low and increase in pressure loss in accompanied with the trapping of PMs is suppressed.

Means for Solving the Problems

In order to achieve the above object, according to the present invention, there is provided a honeycomb structure "including a plurality of cells partitioned by a plurality of partition walls which are made of silicon carbide porous ceramics and are lined up in a single direction, wherein an average value of pore diameters of the partition walls measured by mercury porosimetry is 1 μm to 15 μm, a standard deviation in a pore diameter distribution is 0.20 or less when the pore diameter is represented by common logarithm, and percentage of the pores having the pore diameter of less than 2 μm relative to the entire pores is 5 vol % or less."

Silicon carbide is used as "ceramics."

"Mercury porosimetry" is a method of infiltrating mercury into opening pore under pressure and calculating the diameter of the pores assumed to be cylindrical shape with Washburn equation by using pressure value and volume of mercury. JIS R1655 defined about ceramic green body can be applied to mercury porosimetry. In addition, "an average value of pore diameters measured by mercury porosimetry" refers to the diameter (median diameter) when cumulative pore volume is 50% of the entire pore volume.

The present inventors have studied and found the following. That is, a honeycomb structure in which pressure loss is low at certain degree and filtration efficiency is high can be realized by setting the average value of the pore diameters of the partition walls measured by mercury porosimetry to be 1 μm to 15 μm and the standard deviation in the pore diameter distribution to be 0.20 or less when the pore diameter is represented by common logarithm, but the honeycomb structures still has a problem that pressure loss drastically increases in accompanied with the trapping of PMs after the structure is used. This drastic increase in pressure loss closely relates to percentage of pores having the diameter of less than 2 μm. This has been thought because pores having the diameter of less than 2 μm are closed before pores having a diameter equal to or larger than 2 μm due to the trapping of PMs having the particle diameter of 0.1 to 0.3 μm in a short time after the honeycomb structure is started to be used. Specifically, when the percentage of the pores having the diameter of less than 2 μm relative to the entire pores exceeds 5 vol %, increase in pressure loss has become significant.

Figure 1:
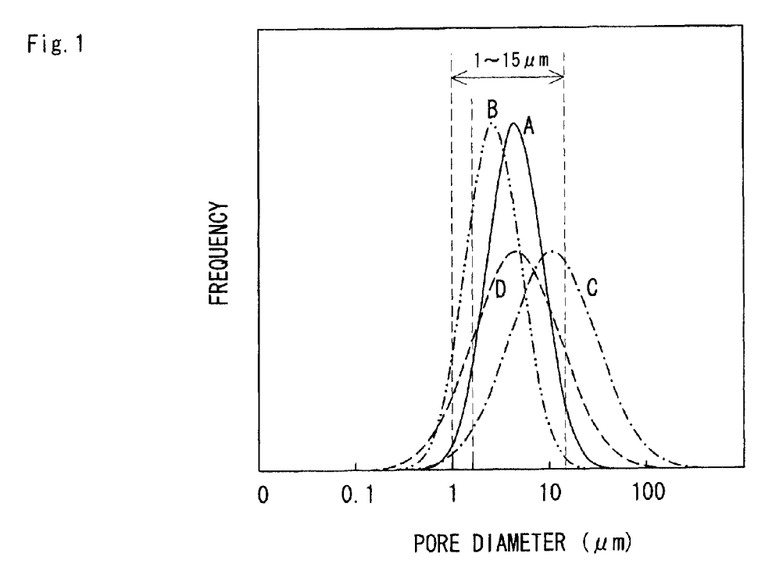
FIG. 1 is a graph schematically illustrating pore diameter distributions of partition walls of the honeycomb structure according to the present invention.

Then, the present invention has a configuration in which the pores having the diameter of less than 2 μm, which are immediately closed due to the trapping of PMs, are 5 vol % or less relative to the entire pores. Here, as described schematically with reference to FIG. 1 which shows the pore diameter distribution normalized as a model, in both of distributions A and B of which standard deviations are 0.08 and distributions C and D of which standard deviations are 0.20, the average pore diameters are 1 to 15 μm and standard deviations are in the range of 0.20 or less. In these distributions, honeycomb structures having the pore diameter distribution such as distributions A and C in which percentage of the pores having the diameter of less than 2 μm relative to the entire pores is 5 vol % or less, are included in the scope of the present invention, while honeycomb structures having the pore diameter distribution such as distributions B and D in which percentage of the pores having the diameter of less than 2 μm is larger than 5 vol % are not included in the scope of the present invention.

With the above configuration, according to the present invention, PMs can be trapped with high filtration efficiency while initial pressure loss is kept to be low. Meanwhile, it is more desirable that percentage of the pores having the diameter of less than 2 μm relative to the entire pores is 1 vol % or less.

The honeycomb structure according to the present invention may have a configuration in which "the partition walls carry a catalyst including at least any one metal of platinum, palladium and rhodium." In addition, the honeycomb structure may have a configuration in which "the partition walls carry a catalyst including at least any one metal of alkali metals and alkaline earth metals."

If PMs are continued to be trapped with the honeycomb structure and the deposition amount of PM on the partition walls increases, it becomes difficult to distribute the gas due to increase in pressure loss so that process of combusting PMs with heating for oxidation treatment is performed. Here, soluble organic fraction (hereinafter, referred to as "SOF") resulting from unburned fuel or the like as well as soot are included in PMs. The SOF is difficult to be oxidatively treated with combustion so that the catalyst including noble metals such as platinum, palladium and rhodium are conventionally used to oxidatively treat SOF with ease by reacting SOF with oxygen in the exhaust gas and converting the resultant to water and carbon dioxide. Alternatively, the catalyst including alkali metals and alkaline earth metals may be used. The combustion temperature of soot can be lowered with the catalyst including such metals.

Figure 10:
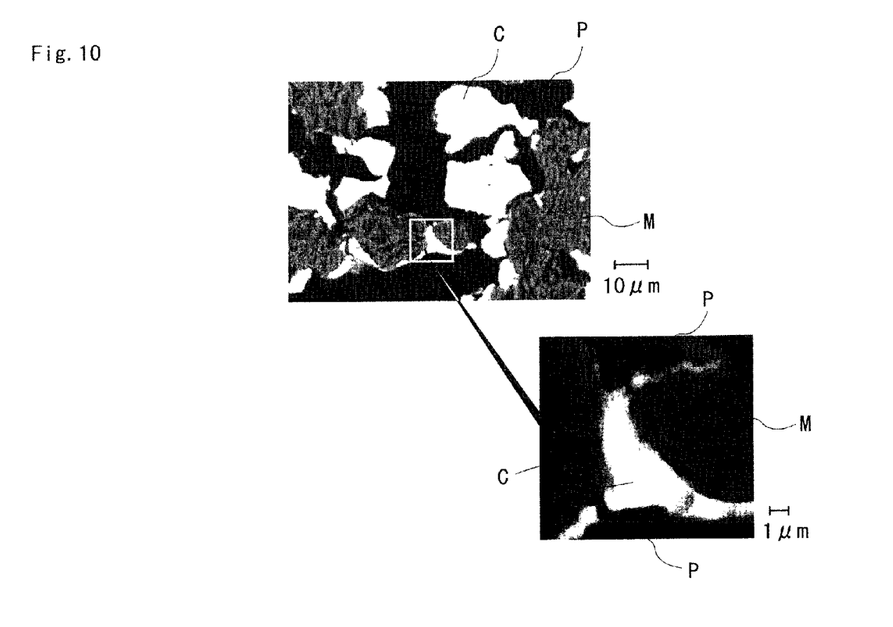
FIG. 10 is an image (COMP image) obtained by observing a cross section of the honeycomb structure with scanning electron microscope.

The present inventors have studied and found that almost all pores having the diameter of less than 2 μm are closed as shown in FIG. 10 when the partition walls of the honeycomb structure are processed to carry the catalyst. Meanwhile, FIG. 10 shows COMP image when cross section of the honeycomb structure is observed with a scanning electron microscope, portions of the deepest color P indicate pores, portions of intermediate color M indicate ceramics matrix, portions of white C indicate the catalyst including cerium based noble metal.

Therefore, according to the present invention of the above configuration, initial pressure loss can be suppressed to be low by suppressing percentage of the pores having the diameter of less than 2 μm, which are easily closed by carrying the catalyst, to be 5 vol % or less relative to the entire pores. In addition, waste in which pores not contributing to the trapping of PMs carry the catalyst using expensive noble metal can be eliminated. Then, a honeycomb structure having a function of efficiently removing PMs trapped by reaction with the catalyst and continuously reproducing as well as a function of collecting PMs can be provided.

It is to be noted that the honeycomb structure according to the present invention uses silicon carbide porous ceramics as porous ceramics.

Therefore, according to the present invention, a configuration in which many spaces exist with partition walls lined up by using silicon carbide having high strength and excellent in heat resistance as porous ceramics is provided and the configuration is suitable for a honeycomb structure used under an environment of high temperature. Further, silicon carbide has excellent heat resistance so that a honeycomb structure which doesn't easily cause deformation or melting damage even by heating at the time of reproduction when PMs are combusted can be provided.

Effect of the Invention

As described above, as the effect of the present invention, there can be provided a honeycomb structure in which filtration efficiency of PMs in the exhaust gas is high, initial pressure loss is low and increase in pressure loss in accompanied with the trapping of PMs is suppressed.

BRIEF DESCRIPTION OF THE INVENTION

BEST MODE FOR CARRYING OUT THE INVENTION

Hereinafter, a honeycomb structure of a preferred embodiment of the present invention will be described with reference to FIG. 2 to FIG. 9. Here, in the embodiment, a case in which the honeycomb structure of the invention is applied as a diesel particulate filter (hereinafter, referred to as "DPF") which traps PMs from the exhaust gas of a diesel engine is described as an example.

Figure 2:
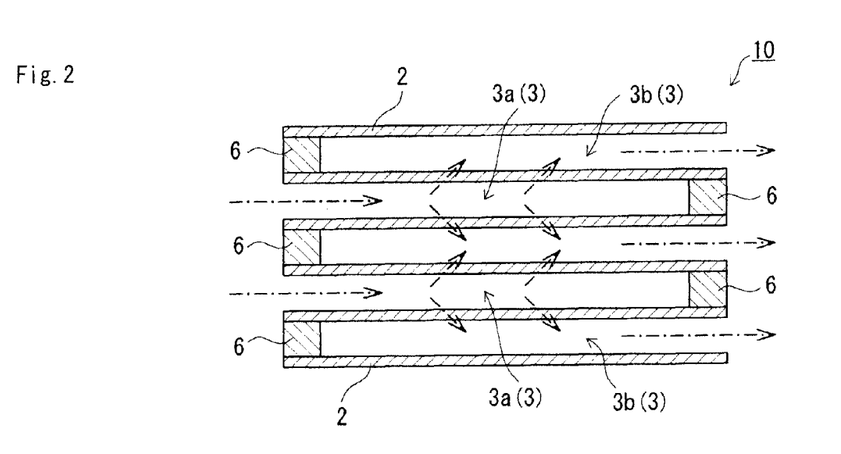
FIG. 2 is a cross sectional side view schematically showing a configuration of the honeycomb structure of the present embodiment.

A honeycomb structure 10 of the embodiment includes a plurality of cells 3 partitioned by a plurality of partition walls 2 which are made of silicon carbide porous ceramics and are lined up in a single direction, as shown in FIG. 2. In the honeycomb structure 10, an average value of pore diameters of the partition walls 2 measured by mercury porosimetry is 1 μm to 15 μm and a standard deviation in a pore diameter distribution is 0.20 or less when the pore diameter is represented by common logarithm, and percentage of the pores having the pore diameter of less than 2 μm relative to the entire pores is 5 vol % or less.

As described in detail, in the embodiment, each of the plurality of cells 3 lined up is sealed at one end thereof with a sealing portion 6 so that each of cells 3a opened in one direction and each of cells 3b opened in the other direction are alternately arranged.

In the honeycomb structure 10 having such a configuration, if the diesel exhaust gas containing PMs flows in from opening ends of the cells 3a, the gas passes through the porous partition walls 2, and then flows out from opening ends of the cells 3b opened in the other direction. When the gas passes through the partition walls 2, then, PMs are trapped through surfaces of partition walls and pores. Here, FIG. 2 shows flows of the gas by dashed lines.

Next, a result of study about relationship between pore diameter and initial pressure loss and relationship between pore diameter and compressive strength will be described below. In the study, the above configuration was employed except for the average pore diameter and a plurality of honeycomb structures having a porosity of about 57%, a cell density of 169 cell/in$^2$ and different average pore diameters were made for use. Further, initial pressure loss was obtained by arranging a cylindrical honeycomb structure having a diameter of about 100 mm and a length of about 140 mm in size at gas channels in the state that PMs are not trapped at all, flowing air having flow rate of 5 Nm$^3$/min and measuring pressure difference between flowing-in-side and flowing-out-side. It is to be noted that the average pore diameter was obtained from the pore diameter distribution measured by mercury porosimetry using a pore sizer 9310 manufactured by SHIMADZU CORPORATION, as a median diameter. Also, the porosity was obtained by Archimedian method.

Figure 3:
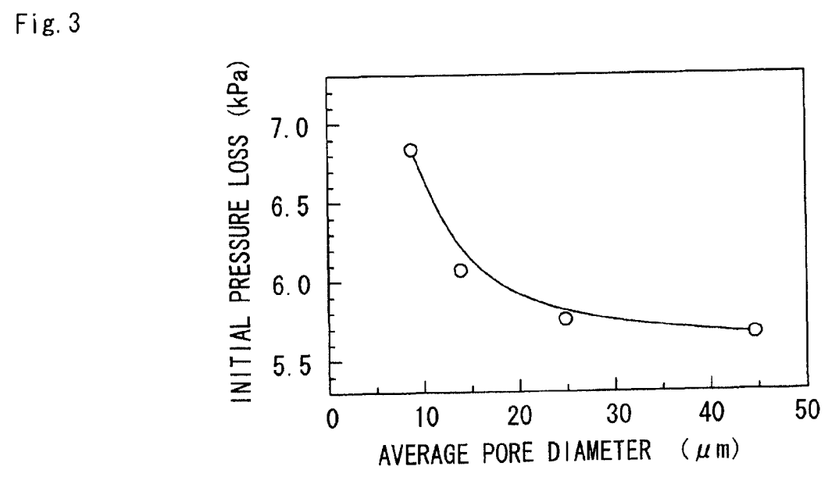
FIG. 3 is a graph illustrating a relationship between average pore diameter and initial pressure loss.

As a result, as shown in FIG. 3, initial pressure loss was substantially constant and low at less than 6 kPa in the range that the average pore diameter was about 25 μm or more, while initial pressure loss was drastically increased when the average pore diameter was smaller than ten μm or so.

Figure 4:
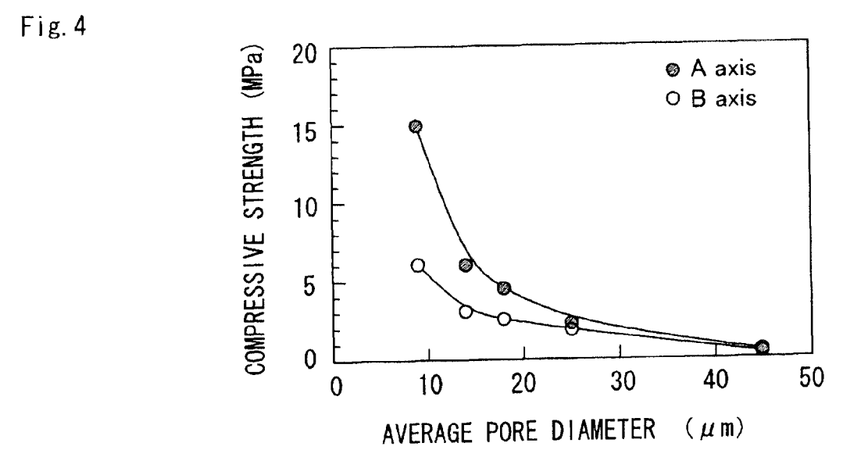
FIG. 4 is a graph illustrating a relationship between average pore diameter and compressive strength.

On the other hand, for the plurality of honeycomb structures as described above, a relationship between pore diameter and compressive strength was found out by measuring a compressive strength of a direction passing through the gas (A axis) and a direction perpendicular to the direction passing through the gas (B axis) at a cross head speed of 1 mm/min based on Japanese Automobile Standards Organization (JASO) M505-87. A result thereof is shown in FIG. 4. Generally, the mechanical strength is reversely correlated to the pore diameter and the trend is significant in FIG. 4. The compressive strength was largely decreased when the average pore diameter was larger than around 20 μm.

As a result above, it is considered that the limit value of the pore diameter at which the pore diameter can be increased with the mechanical strength maintained at certain degree is about 20 μm. In consideration of the result of the study about initial pressure loss, according to the honeycomb structure of the embodiment in which the average value of the pore diameters is set to be 1 μm to 15 μm, initial pressure loss can be, therefore, suppressed to be low with the mechanical strength maintained at certain degree.

Next, a result of study about a relationship between pressure loss and percentage (vol %) of pores having the diameter of less than 2 μm relative to the entire pores will be described below. Various kinds of honeycomb structures which have a porosity of 50% and different pore diameter distributions were made into cylindrical shapes each having a diameter of about 140 mm and a length of about 150 mm and used in the study. Then, these honeycomb structures were arranged in gas channels, respectively, and the gas containing PMs was distributed at a flow rate of 5 Nm$^3$/min. Pressure difference between flowing-in-side and flowing-out-side was measured when 2 g of PM per liter of volume of the honeycomb structure (2 kg of PM per m$^3$ of the honeycomb structure) was deposited. The result is shown in FIG. 5.

Figure 5:
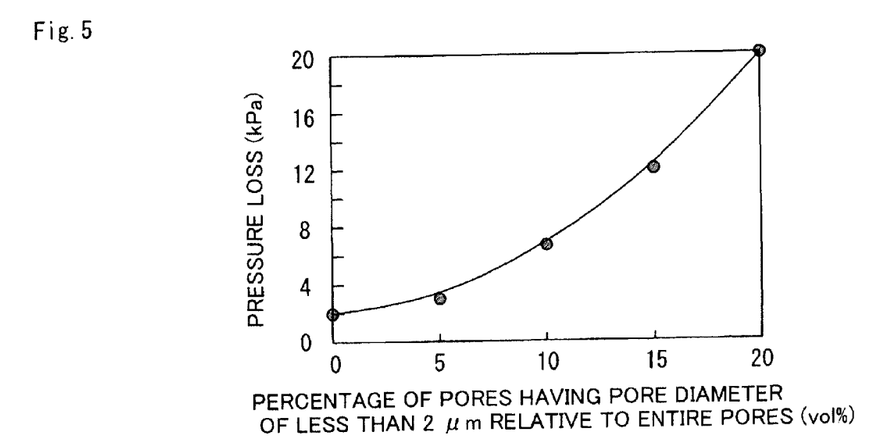
FIG. 5 is a graph illustrating a relationship between percentage (vol %) of the pores having the diameter of less than 2 μm relative to the entire pores and pressure loss.

As apparent from FIG. 5, as percentage (vol %) of pores having the diameter of less than 2 μm relative to the entire pores increases, pressure loss increases, and the degree of increase of pressure loss becomes significant as the percentage of pores having the diameter of less than 2 μm increases.

Here, percentage of pores having the diameter of less than 2 μm relative to the entire pores is assumed to be 10 vol % or less, pressure loss can be suppressed to be three times as initial pressure loss at which PMs are not deposited even at the stage where PMs have been trapped.

Hereinafter, a specific example of the embodiment will be described in comparison with the comparative examples. In Example and Comparative Examples 1 to 3, at first, each of powders of material mixture having compositions illustrated in Table 1 was mixed with organic binder (methyl cellulose), water, surfactant and the resultant was kneaded. Next, the kneaded plasticized compound was extruded through a honeycomb die and the extruded green body was sintered under non-oxidizing atmosphere at 2300° C. for 10 minutes to produce a honeycomb structure. It is to be noted that any of honeycomb structures in Example and Comparative Examples 1 to 3 had cylindrical shapes each having a cell density of 200 cell/in$^2$, a thickness of partition walls of 0.4 mm, a diameter of about 140 mm and a length of about 150 mm.

TABLE 1

| Powder of material mixture (100 wt %) |
| --- |
| Average pore diameter (μm) |
| Standard deviation |
| Percentage of pores having diameter of less than 2 μm (vol %) |
| Example |
| SiC powder (diameter: 12 μm) |
| Si$_3$N$_4$ powder (diameter: 10 μm) |
| C powder (diameter: 15 μm) |
| Comparative Example 1 |
| SiC powder (diameter: 12 μm) |
| SiC powder (diameter: 1 μm) |
| Comparative Example 2 |
| SiC powder (diameter: 40 μm) |
| Si powder (diameter: 5 μm) |
| Comparative Example 3 |
| SiC powder (diameter: 9.5 μm) |
| Si$_3$N$_4$ powder (diameter: 10 μm) |
| C powder (diameter: 15 μm) |

Figure 6:
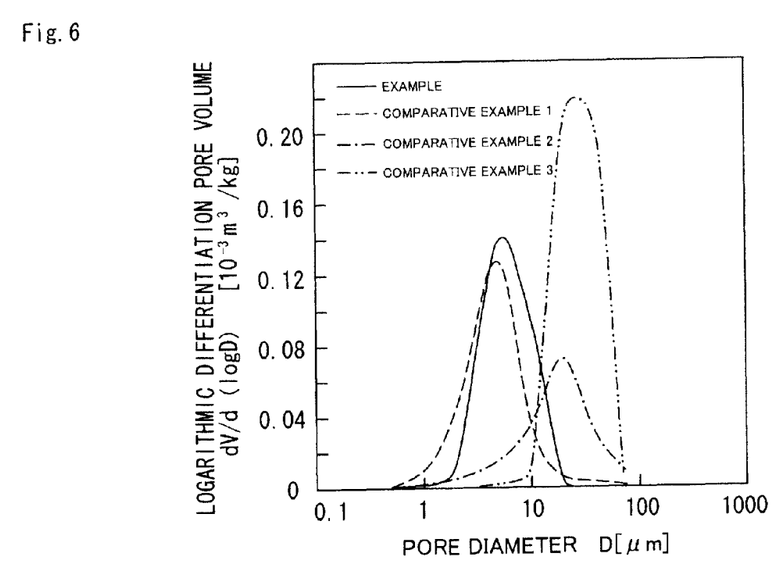
FIG. 6 is a graph illustrating a curve of the pore diameter distribution of the honeycomb structure according to the embodiment in comparison with those of comparative examples.
Figure 7:
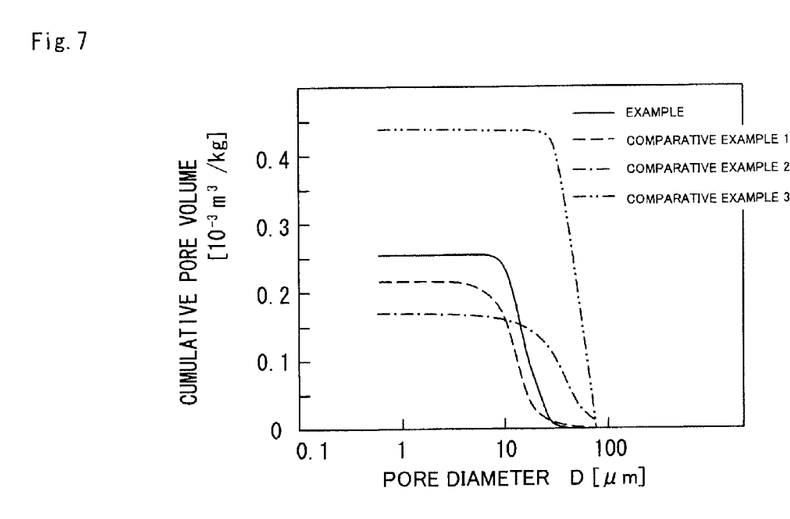
FIG. 7 is a graph illustrating a curve of the pore diameter distribution of the honeycomb structure according to the embodiment in comparison with those of comparative examples.

The pore diameter distribution was measured with mercury porosimetry as described above for each of honeycomb structures. The resulting curves of the pore diameter distributions are shown in FIG. 6 and FIG. 7. The average pore diameters obtained from the pore diameter distributions are also shown in Table 1. In addition, the standard deviations of the pore diameter distributions when the pore diameters measured by mercury porosimetry are represented by common logarithm, percentages (vol %) of pores having the pore diameter calculated based on cumulative pore diameter of less than 2 μm relative to the entire pores are also shown in Table 1.

As seen from Table 1, each of Comparative Examples 1 to 3 is an example which lacks any one of three requirements that "an average value of pore diameters measured by mercury porosimetry is 1 μm to 15 μm", "a standard deviation in a pore diameter distribution is 0.20 or less when the pore diameter is represented by common logarithm", and "percentage of the pores having the diameter of less than 2 μm relative to the entire pores is 5 vol % or less."

Subsequently, pressure loss and filtration efficiency were evaluated for each of honeycomb structures of Example and Comparative Examples 1 to 3. Here, pressure loss was evaluated by distributing the gas containing PMs at flow rate of 5

Nm³/min through the honeycomb structure arranged at gas channels and measuring the change in pressure loss in accompanied with increase of the deposition amount of PM. Further, filtration efficiency was evaluated by the following method. At first, each of honeycomb structures of Example and Comparative Examples 1 to 3 was attached as DPF to the automobile (2500 cc displacement, SERENA manufactured by NISSAN MORTOR CO., Ltd) equipped with a diesel engine to maintain the automobile at an idling state (700 rpm). Immediately after that, gases were collected at the flowing-in-side and flowing-out-side of the honeycomb structure. The collected gases were introduced to the Electrical Low Pressure Impactor (ELPI manufactured by Dekati, Ltd.), the particle diameter distribution was measured in the range of 0.01 to 10 μm and filtration efficiency was calculated by number concentration of PMs at flowing-in-side and flowing-out-side. The measurement was performed three times and the average value thereof was used as a measurement result.

Figure 8:
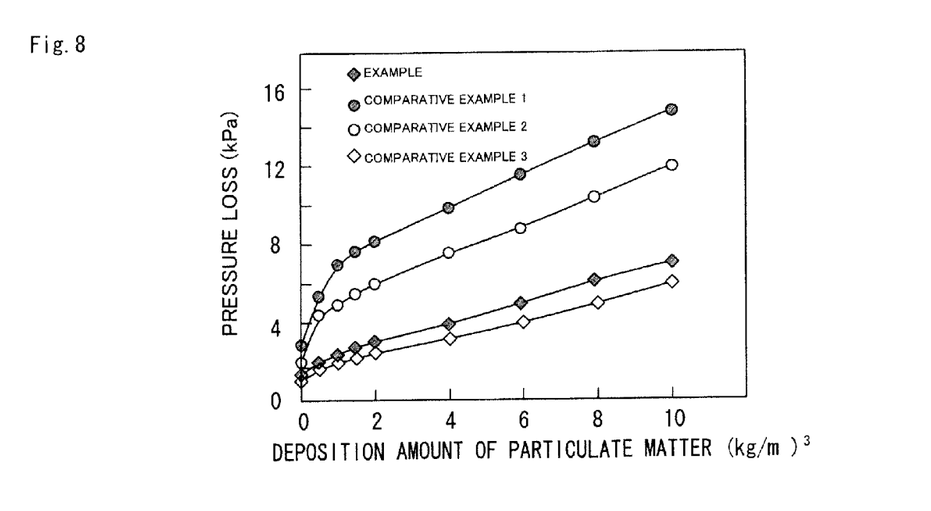
FIG. 8 is a graph illustrating change in pressure loss in accompanied with increase in deposition amount of PM of the honeycomb structure according to the embodiment in comparison with those of comparative examples.
Figure 9:
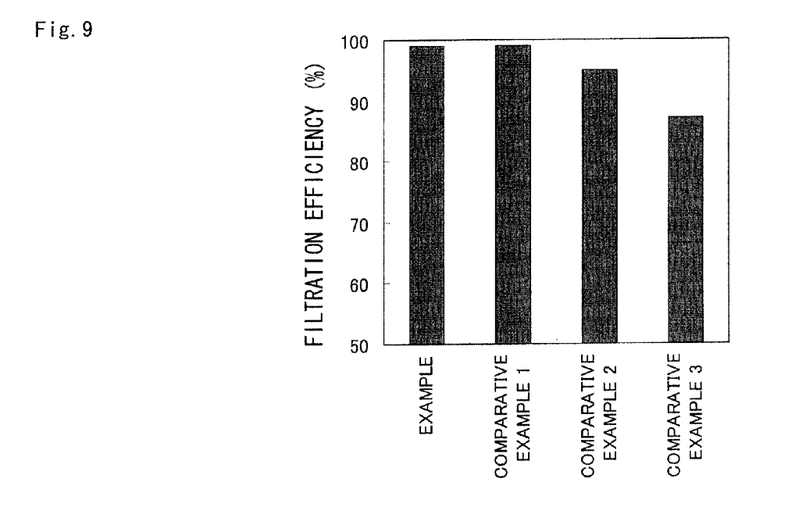
FIG. 9 is a graph illustrating filtration efficiency of the honeycomb structure according to the embodiment in comparison with those of comparative examples.

The measurement result of pressure loss is shown in FIG. 8 and the measurement result of filtration efficiency is shown in FIG. 9. As apparent from FIG. 8, in Comparative Example 1, pressure loss was significantly increased at the stage where deposition amount of PM was 0 to 2 (kg/m³), namely, at the initial stage where PMs were started to be trapped. This was attributed to the fact that, in Comparative Example 1, percentage of pores having the diameter of less than 2 μm is large at 23 vol %, percentage of pores immediately closed by the trapping of PMs relative to the entire pores is large. Accordingly, in the honeycomb structure of Comparative Example 1, filtration efficiency was high at 99% or more, while load for distributing gas was expected to be largely increased over time.

Also in Comparative Example 2, pressure loss was significantly increased at the initial stage where PMs were started to be trapped. This was attributed to the fact that, in Comparative Example 2, the number of pores having the diameter easily closed at the initial stage is relatively large because the standard deviation is large and variation in pore diameters is large though percentage of pores having the diameter of less than 2 μm is small. It was thought that, as shown in FIG. 9, filtration efficiency in Comparative Example 2 was about 95% and lower than that in Example so that the number of pores having the diameter suitable to the trapping of PMs was relatively small in Comparative Example 2.

On the other hand, in Comparative Example 3, initial pressure loss was low and increase in pressure loss in accompanied with deposition amount of PM was small but filtration efficiency was low at about 87%. It was thought that resistance for distributing the gas was small but PMs easily passed through pores without being trapped because the average pore diameter was large at 22 μm and pore diameters were uniformly large as appreciated from the standard deviation and a curve of the pore diameter distribution.

With respect thereto, in Example, although initial pressure loss was low and increase in pressure loss in accompanied with deposition amount of PM was moderate as in Comparative Example 3, filtration efficiency was unexpectedly high at 99% or more. In other words, in this Example, PMs can be effectively trapped while the gas is easily distributed to the same extent of a honeycomb structure having a large pore diameter.

As described above, according to the honeycomb structure of the embodiment, which fulfills three requirements that "an average value of pore diameters measured by mercury porosimetry is 1 μm to 15 μm", "a standard deviation in a pore diameter distribution is 0.20 or less when the pore diameter is represented by common logarithm", and "percentage of the pores having the pore diameter of less than 2 μm relative to the entire pores is 5 vol % or less," PMs could be trapped at high filtration efficiency while initial pressure loss was maintained to be low.

Although the present invention has been described with reference to a preferred embodiment, the present invention is not limited to the above embodiment, and as will be described below, various modifications and changes in design can be made in the rage without departing from a spirit of the present invention.

For example, a case in which a honeycomb structure of the present invention is applied as DPF has been described, but the present invention is not limited thereto. For example, the honeycomb structure of the present invention can be widely applied as a filter cleaning up the gas exhausted from an internal combustion such as a gasoline engine or a boiler.

TABLE 1

| | Powder of material mixture (100 wt %) | | Average pore diameter (μm) | Standard deviation | Percentage of pores having diameter of less than 2 μm (vol %) |
|---|---|---|---|---|---|
| Example | SiC powder (diameter: 12 μm) | 75 wt % | 8 | 0.16 | 5 |
| | Si₃N₄ powder (diameter: 10 μm) | 20 wt % | | | |
| | C powder (diameter: 15 μm) | 5 wt % | | | |
| Comparative Example 1 | SiC powder (diameter: 12 μm) | 80 wt % | 2 | 0.18 | 23 |
| | SiC powder (diameter: 1 μm) | 20 wt % | | | |
| Comparative Example 2 | SiC powder (diameter: 40 μm) | 80 wt % | 14 | 0.42 | 5 |
| | Si powder (diameter: 5 μm) | 20 wt % | | | |
| Comparative Example 3 | SiC powder (diameter: 9.5 μm) | 50 wt % | 22 | 0.14 | 0.03 |
| | Si₃N₄ powder (diameter: 10 μm) | 40 wt % | | | |
| | C powder (diameter: 15 μm) | 10 wt % | | | |

FIG. 1

FREQUENCY

PORE DIAMETER (μm)

FIG. 3

INITIAL PRESSURE LOSS (kPa)

AVERAGE PORE DIAMETER (μm)

FIG. 4

COMPRESSIVE STRENGTH (MPa)

AVERAGE PORE DIAMETER (μm)

FIG. 5

PRESSURE LOSS (kPa)

PERCENTAGE OF PORES HAVING PORE DIAMETER OF LESS THAN 2 μm RELATIVE TO ENTIRE PORES (vol %)

FIG. 6

EXAMPLE

COMPARATIVE EXAMPLE 1

COMPARATIVE EXAMPLE 2

COMPARATIVE EXAMPLE 3

LOGARITHMIC DIFFERENTIATION PORE VOLUME dv/d(logD) [$10^{-3}$ m$^3$/kg]

PORE DIAMETER (μm)

FIG. 7

EXAMPLE

COMPARATIVE EXAMPLE 1

COMPARATIVE EXAMPLE 2

COMPARATIVE EXAMPLE 3

CUMULATIVE PORE VOLUME [$10^{-3}$ m$^3$/kg]

PORE DIAMETER D (μm)

FIG. 8

EXAMPLE

COMPARATIVE EXAMPLE 1

COMPARATIVE EXAMPLE 2

COMPARATIVE EXAMPLE 3

PRESSURE LOSS (kPa)

DEPOSITION AMOUNT OF PARTICULATE MATTER (kg/m$^3$)

FIG. 9

FILTRATION EFFICIENCY (%)

EXAMPLE

COMPARATIVE EXAMPLE 1

COMPARATIVE EXAMPLE 2

COMPARATIVE EXAMPLE 3

The invention claimed is:

1. A honeycomb structure comprising
a plurality of cells partitioned by a plurality of partition walls which are made of silicon carbide porous ceramics and are lined up in a single direction,
characterized in that an average value of pore diameters of the partition walls measured by mercury porosimetry is 1 μm to 15 μm, and a standard deviation in a pore diameter distribution is 0.20 or less when the pore diameter is represented by common logarithm, and
percentage of the pores having the pore diameter of less than 2 μm relative to the entire pores is 5 vol % or less.

2. The honeycomb structure according to claim 1, characterized in that the partition walls carry a catalyst including at least any one metal of platinum, palladium and rhodium.

3. The honeycomb structure according to claim 1, characterized in that the partition walls carry a catalyst including at least any one metal of alkali metals and alkaline earth metals.

* * * * *